No. 856,318. PATENTED JUNE 11, 1907.
P. H. TURLEY.
AUTOMATIC KEY CONNECTING MEANS FOR A COMBINED TYPE WRITER AND ADDER.
APPLICATION FILED DEC. 31, 1906.

Witnesses
Jas. K. McCathran
Louis G. Julihn

Patrick H. Turley, Inventor
By C. G. Siggers
Attorney

No. 856,318. PATENTED JUNE 11, 1907.
P. H. TURLEY.
AUTOMATIC KEY CONNECTING MEANS FOR A COMBINED TYPE WRITER AND ADDER.
APPLICATION FILED DEC. 31, 1906.

Witnesses
Jas. K. McCathran
Louis G. Julihn

Patrick H. Turley, Inventor
By C. G. Siggers
Attorney

No. 856,318. PATENTED JUNE 11, 1907.
P. H. TURLEY.
AUTOMATIC KEY CONNECTING MEANS FOR A COMBINED TYPE WRITER AND ADDER.
APPLICATION FILED DEC. 31, 1906.

Patrick H. Turley, Inventor

Witnesses

By

Attorney

UNITED STATES PATENT OFFICE.

PATRICK H. TURLEY, OF HARRISBURG, PENNSYLVANIA, ASSIGNOR TO ELLIOTT-FISHER COMPANY, OF NEW YORK, N. Y., A CORPORATION OF DELAWARE.

AUTOMATIC KEY-CONNECTING MEANS FOR A COMBINED TYPE-WRITER AND ADDER.

No. 856,318.      Specification of Letters Patent.      Patented June 11, 1907.

Application filed December 31, 1906. Serial No. 350,180.

*To all whom it may concern:*

Be it known that I, PATRICK H. TURLEY, a citizen of the United States, residing at Harrisburg, in the county of Dauphin and State of Pennsylvania, have invented a new and useful Automatic Key-Connecting Means for Combined Type-Writers and Adders, of which the following is a specification.

This invention relates to a combined typewriting and adding machine, and has for its object to provide simple and efficient means whereby the numeral keys of the typewriter will be automatically connected with the adding mechanism when the printing point of the machine is presented opposite the adding field; and automatically disconnected when the printing point is presented outside of said field, so that, when the machine is operated to print digits outside of the adding field, the keys will not be burdened by the adding mechanism or its operating connections.

A further object is to provide improved key-operated mechanism for rendering the automatic controlling mechanism inoperative, so that, when desired, the unrestricted independent operation of the typewriter may be secured, even when the printing point of the machine is disposed to print in what would otherwise be the adding field.

Other objects subordinate to those stated will appear as the succeeding description of the illustrated embodiment of the invention is developed.

In the accompanying drawings Fig. 7 is a section on the line 7—7 of Fig. 3 with the disconnecting key in the position it assumes when operated to render the automatic controlling mechanism inoperative.

Each part wherever shown is indicated by the same reference character.

For the purpose of this disclosure, the elements comprehended by my invention are shown applied to the Elliott-Fisher billing machine of commerce. This machine includes what is known as a flat platen typewriter equipped with adding mechanism arranged to be operated by the numeral keys to totalize a column of numbers as the numbers are printed by the typewriter.

Figure 1:
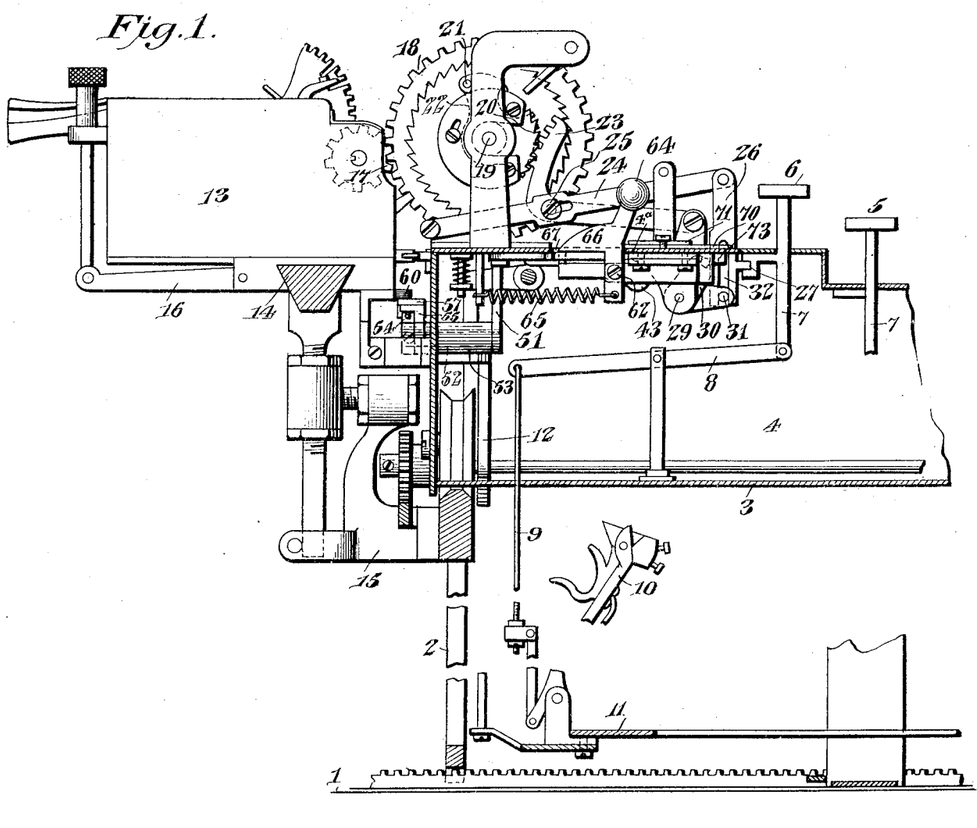
—Figure 1 is a sectional elevation of a combined typewriting and adding machine equipped in accordance with my invention.
Figures 1, 8:
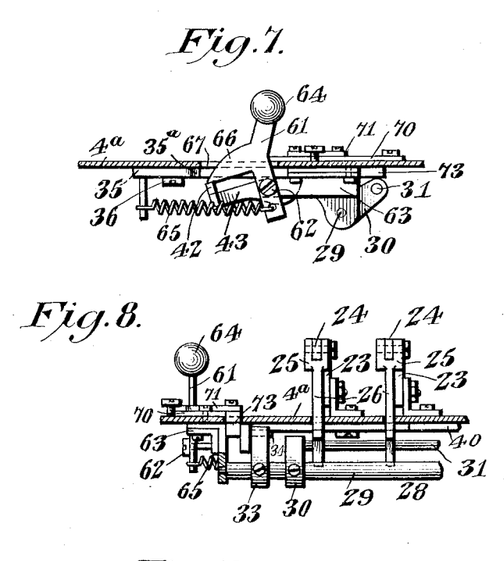
Fig. 8 is a section on the line 8—8 of Fig. 3.

*The general organization of the billing machine.* Mounted to travel longitudinally of the flat platen 1 to line space the writing, is a machine frame 2 upon which the carriage 3 travels laterally of the platen for letter spacing. The upper portion of the carriage is in the form of a casing 4 surmounted by letter and numeral keys 5 and 6 the stems 7 of which are connected to key levers 8 fulcrumed in the casing 4 and connected by draw-wires 9 to downwardly swinging type bars 10. The type bars are fulcrumed on a type ring 11 pendent from the carriage casing, as shown in Fig. 1. The carriage is moved to the right by the usual propelling mechanism including spring drums and tapes, not shown, and is controlled by a key-operated escapement indicated generally at 12. As usual in this class of machines, the characters are printed one at a time by the depression of the keys, and the carriage advances step-by-step under the control of the escapement as the keys rise to their normal positions.

*The adding mechanism.* The adding mechanism, which is combined with the type writing machine, includes a computing device or register 13 adjustable longitudinally of a guide-bar 14 carried by brackets 15 secured to the main frame 2 upon which, as already stated, the carriage 3 travels. By its adjustment on the bar 14 the register 13 is located in position for use with reference to a column located at any desired point on the work sheet and is secured in such position by a locking device 16.

The specific character of the computing and registering mechanism is not material, but it embraces, as usual, a series of denominational members, number wheels, or digit carriers 17 exposed at the front of the register and equipped with suitable carrying mechanism whereby, when the value accumulated upon any wheel reaches the limit of that particular order or denomination, the value so accumulated will be automatically transferred to the wheel of next higher order. The adding mechanism also includes actuating mechanism for the register 13. This actuating mechanism is mounted on and movable with the carriage 3. Its primary element is in the form of an actuator or master wheel 18, advanced laterally into engagement with successive number wheels of the register by the movement of the carriage, and rotated a different distance by each numeral key for the purpose of moving the engaged number wheel of the register a distance proportionate to the value of the particular numeral key from which the actuator is operated. Thus, when any numeral key is depressed, the digit of corresponding value will be printed on the work sheet in a given denominational position, and the number wheel of corresponding denomination will be given a movement of corresponding value so that the value of the printed digit will be added to the amount already accumulated in the register.

The master wheel or actuator 18 is fixed to a comparatively long actuator shaft 19 suitably supported above the carriage 3 and each numeral key is operatively connected with the shaft 19 by one of a series of operating connections all of which are identical in construction and operation, except as to a graduated variation of the movement transmitted to the shaft from the several keys. One of these operating connections is shown in Fig. 1. This connection includes a ratchet wheel 20 fixed to the shaft 19 and designed to be engaged by a driving pawl 21 pivoted at one end of a driving arm or lever 22 mounted to swing loosely on the shaft 19. The opposite end of the lever 22 is geared to the rear end of a lever 23 fulcrumed at its front end upon the carriage casing and arranged in crossing relation with a lever 24 fulcrumed at its rear end upon the carriage. The levers 23 and 24 are provided with a loose pivotal connection 25 at their point of intersection and from the front end of the lever 24 depends a link 26 connected to the adjacent numeral key stem 7 by a separable connection 27 located within the casing 4.

In printing outside of the column or adding field the actuator 18 is out of coincidence with the register 13 and therefore the latter is not operated when a digit is printed. If the connections between the links 26 and the numeral keys 6 were maintained, however, the keys when printing digits outside of the adding field would be burdened by the operating mechanism of the register, which mechanism would necessarily be operated each time the key is depressed. This unnecessary burdening of the numeral keys when printing outside of the column is obviously undesirable, and it is for this reason that the links 26 are arranged to be swung out of engagement with the numeral keys so as to render the latter entirely independent of the register or its operating connections.

Figure 5:
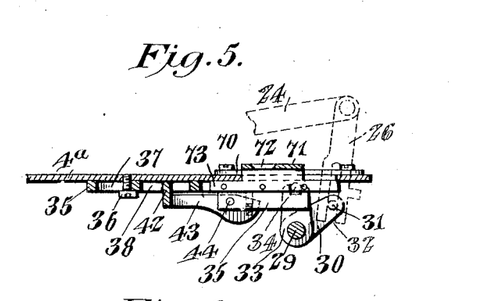
Fig. 5 is a sectional view on the line 5—5 of Fig. 3.

In accordance with the present invention, the several links 26, instead of being connected with the key stems 7, as shown in Fig. 1, are normally held back out of engagement with the key stems, as indicated in dotted lines in Fig. 5. Therefore, in printing digits at the left hand side of the adding field or column, the keys being entirely disconnected, will not be burdened by the register operating mechanism.

*The means for automatically connecting the keys with the register operating mechanism when the printing point of the typewriter is presented to the adding field.* In accordance with the present invention, the keys are designed to be automatically connected with the register operating mechanism whenever, in the advance of the carriage, the printing point of the typewriter moves into the adding field or column and the actuator or master wheel moves to a position opposite the register. To effect this automatic control of the connection, a swinging yoke 28 is mounted in suitable bearings at the under side of the cover-plate 4ª of the carriage casing 4. This yoke includes a rock shaft 29 provided with radial arms 30 between the ends of which extends a bar 31. The bar 31 is located within vertical slots 32 in the links 26 and thus serves to guide the links when the latter are reciprocated by the keys for the purpose of operating the register. In order to simultaneously connect all of the links 26 with the numeral keys 6 of the typewriter, it is merely necessary to shift the yoke 28 to the position shown in Fig. 1 from the normal position of the yoke illustrated in Fig. 5.

Figure 3:
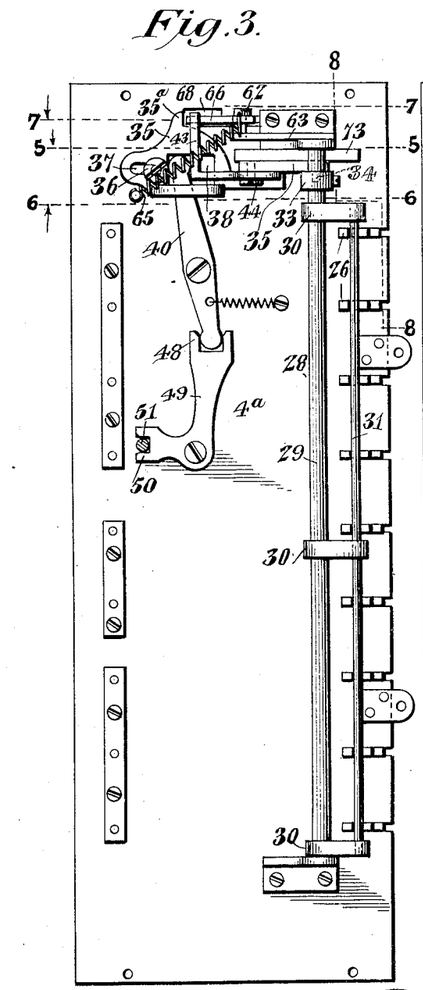
Fig. 3 is a bottom plan view of the cover-plate of the carriage with the parts attached thereto shown in their normal positions.

To facilitate the operation of the yoke for the purpose stated, the shaft 29 is provided adjacent to one end of the carriage with a notched arm 33, see Fig. 5, engaged by a pin 34 projecting laterally from a slide 35 imposed against the under side of the cover-plate 4ᵃ, see Fig. 3, and retained by a headed screw 36 passed through a slot 37 in the slide and secured to the plate 4ᵃ. By moving the slide 35 forward from the position shown in Fig. 5, the yoke 28 may be swung to the position indicated in Fig. 1 to present the links 26 in engagement with the key stems.

Figure 10:
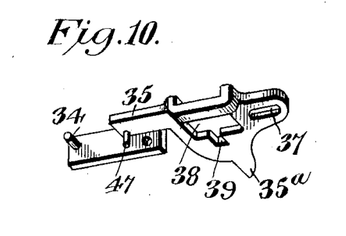
Fig. 10 is a detail view of the slide.
Figure 11:
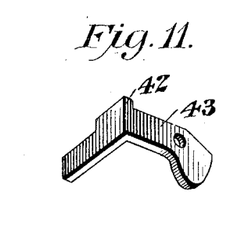
Fig. 11 is a similar view of the swinging abutment.
Figure 12:
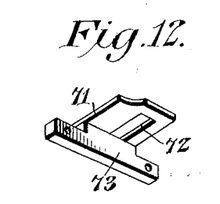
Fig. 12 is a detail view of the upper indicator plate.

Extending inwardly from one side edge of the slide 35 is a recess 38 at the center of the bottom wall of which is a notch 39. See Fig. 10. The recess 38 is designed for the accommodation of one end of a lever 40 fulcrumed upon the under side of the cover-plate 4ᵃ and having connected thereto a retracting spring 41 which tends to urge the lever 40 in a direction to cause the retraction of the slide 35 and the consequent disengagement of the keys. When the lever 40 is urged in the opposite direction by mechanism to be described, for the purpose of moving the slide 35 forward to cause the engagement of the keys, the end of the lever 40 located within the recess 38 bears against the flange 42 of a swinging abutment 43 of angular form, see Figs. 3, 4 and 11. One arm of the abutment 43 is fulcrumed upon a screw 44 projecting laterally from the slide, and said abutment is yieldingly retained in its normal position, indicated in Fig. 6, in which position the abutment flange 42, which is disposed transverse to the slide 35, extends into the recess 38 and into engagement with one side edge of the lever 40. In this normal position of the swinging abutment, the lever 40, when swung in a direction to effect the connection of the keys, bears against the abutment flange 42 and thus transmits movement to the slide 35, which, as before stated, carries the abutment. The notch 39 is provided for the accommodation of one end of the flange 42 when the latter is in its elevated or normal position.

Figures 6, 9:
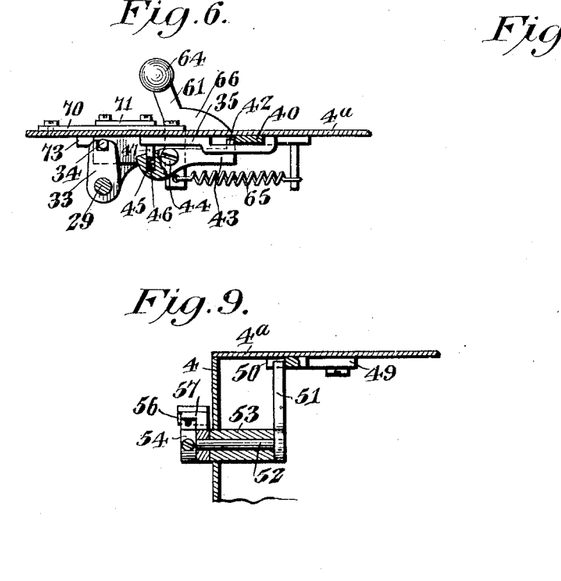
Fig. 6 is a similar view on the line 6—6 of Fig. 3.
Fig. 9 is a detail section showing the mounting of the controlling lever or trigger and the parts immediately associated therewith.

Any suitable means for retaining the abutment in the position indicated in Fig. 6 may be provided, but by preference, the fulcrumed arm of the abutment is provided adjacent to its front end with a spring socket 45 containing a spring 46, which bears against one end of a pin 47 projecting downwardly from the slide 35 and into the socket. For the purpose of operating the lever 40, the end of the lever farthest from the slide 35 is engaged by the forked end 48 of a bell crank lever 49 fulcrumed upon the under side of the cover-plate 4ᵃ and having its opposite end forked, as indicated at 50, for engagement with an arm 51 extended upwardly from a rock shaft 52 extended through the rear wall of the casing 4 and journaled in a sleeve bearing 53 secured to said wall in any suitable manner.

Figure 2:
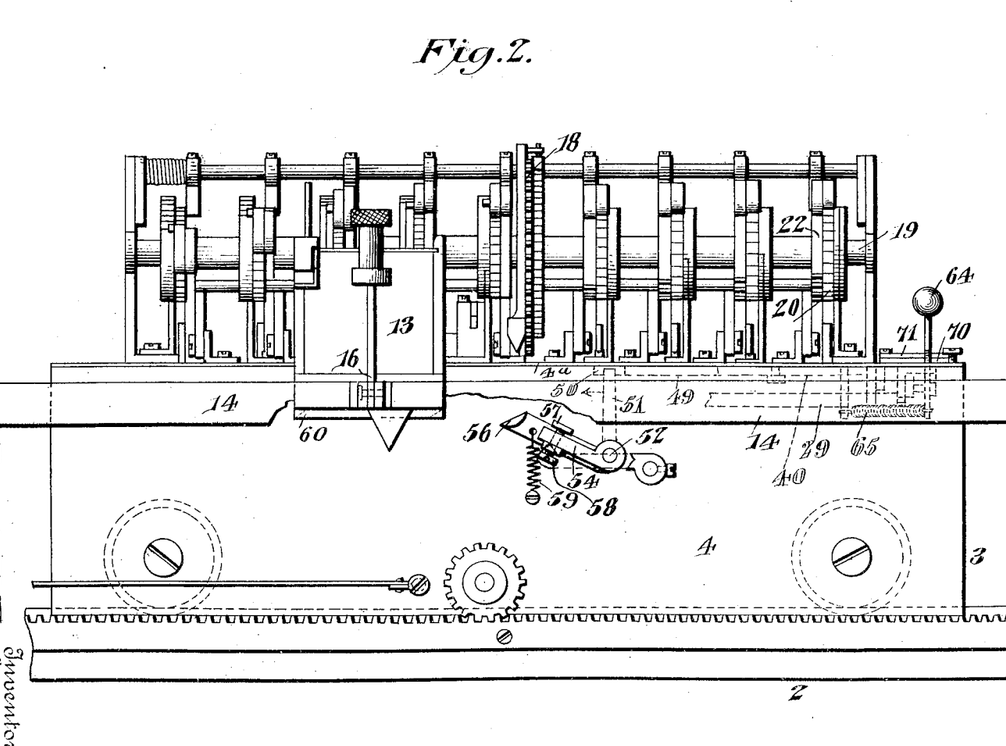
Fig. 2 is a rear elevation of a portion of the same subject-matter.

At the rear end of the shaft 52 is fixed an arm 54 located in rear of the casing, as shown in Figs. 2 and 9, and between this arm and the rear end of the sleeve bearing 53 the shaft is provided with a loose cam arm 55 provided at its extremity with a cam 56 projecting laterally from the arm. The arm 55 is provided with a laterally disposed lug 57 which extends over the arm 54 and serves to compel the arm 54 to swing down when the cam arm 55 is depressed, while permitting the arm 55 to be swung up independently of the arm 54. The relation of the two arms 54 and 55 is adjusted by means of an adjustment screw 58 passed through the arm 54 and bearing against the under side of the lug 57, and the retraction of the loose arm 55 to its normal position after being elevated independently of the arm 54 is effected by a retracting spring 59 secured at one end to the arm 55 and at its opposite end to the casing 4. It will now be evident that by depressing the arm 55, the consequent depression of the arm 54 will rock the shaft 52 and swing the arm 51 to the right, or to the left when viewing the machine from the rear, as shown in Fig. 2. This movement of the arm 51 will cause the bell crank lever 49 to swing the lever 40 against the resistance of the spring 41 and thus advance the slide 35 to effect the connection of the keys with the register operating connections.

Figures 15, 16, 18:
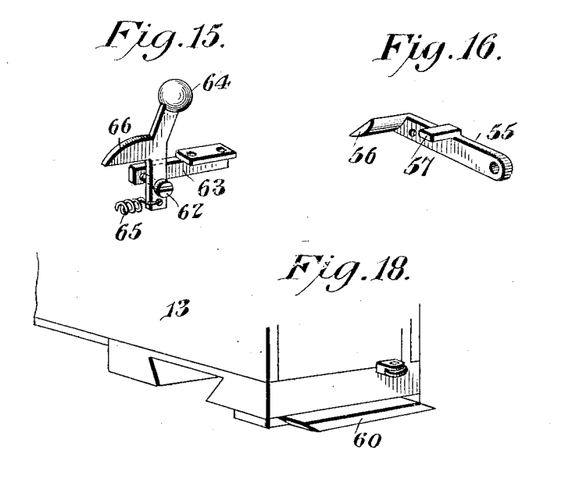
Fig. 15 is a detail view of the key and directly associated parts.
Figs. 16 is a detail view of the loose section of the trigger.
Fig. 18 is a detail perspective view of a portion of the register with the trip or cam in place.
Figure 17:
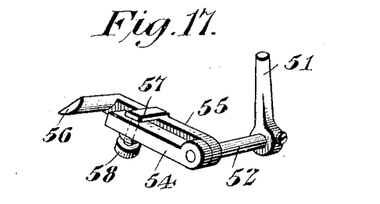
Fig. 17 is a perspective view of the trigger and the associated parts.

The depression of the arm 55 to cause the operation just described is effected automatically by the advance of the carriage which, at a predetermined point in the carriage movement, will bring the cam 56 at the end of the arm 55 into engagement with a relatively fixed cam plate 60 secured to and extended across the front of the register 13, as shown in Figs. 1 and 18. The ends of the plate 60 are oppositely beveled, as shown, so that, when the carriage is advancing to the right (to the left in Fig. 2) the cam 56 will be caused to ride under the cam 60 and thus automatically connect the keys with the adding mechanism, while the movement of the carriage in the opposite direction will merely cause the cam 56 to ride up over the plate 60 without effecting any operation of the mechanism other than the idle lifting of the arm 55.

It will be noted that the cam plate 60 is substantially coincident in length with the width of the column or adding field. Therefore, the parts will be automatically operated to connect the keys with the adding mechanism when the actuator 18 moves to a position opposite the register, the parts being retained in the positions to which they are thus moved until the actuator has traversed the register, at which time the cam 56 will pass out from under the cam plate 60 and permit the spring 41 to retract the parts, and thus effect the automatic disconnection of the keys in order to permit the unrestricted independent use of the typewriter to print beyond the adding field or column.

Figure 4:
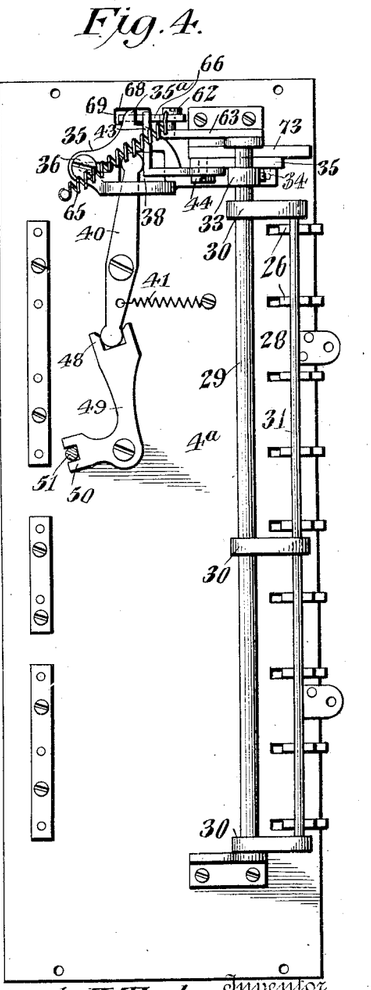
Fig. 4 is a similar view with the parts shown in the positions they assume when the keys are connected with the adding mechanism.

*The means for rendering the automatic key connecting mechanism inoperative.* For some classes of work the use of the adding mechanism is unnecessary, and in that event it is desirable that the automatic mechanism for connecting the keys be rendered inoperative, so that the keys will not be connected with the register operating mechanism at any time during the carriage movement. It is for this reason that I provide the slide 35 with the movable abutment 43, since it will be obvious that by depressing this abutment to the position shown in Fig. 7, the abutment flange 42 will be moved down out of the path of the lever 40, so that, when the latter is swung, it will play idly in the recess 38, instead of shifting the slide 35 to cause the connection of the keys. This depression of the abutment 43 to render the automatic mechanism inoperative is effected by means of a key lever 61 fulcrumed at 62 upon a bracket 63 secured to the under side of the cover-plate. The lever 61 is extended upwardly through a slot in the cover-plate 4ª and is formed at its upper end with what may be termed a disconnecting key 64 by means of which it is swung against the resistance of a spring 65 to cause an arm 66, projecting laterally from the lever, to depress the abutment 43 the laterally disposed arm of which it overlies. The slot 67 in the cover-plate 4ª through which the lever 61 extends, is provided with an offset portion 68 adjacent to one end thereof, into which the lever is moved laterally and retained after being operated, the fulcrum 62 of said lever being sufficiently loose, as shown in Fig. 4, to permit this engagement of the shoulder 69 formed by the offset of the slot, see position indicated in dotted lines in Fig. 14.

When the lever 61 is in its normal position, as shown in Fig. 6, for instance, it opposes no resistance whatever to the automatic operation of the mechanism, because as the slide 35 is operated, the abutment 43 moves back and forth beneath the arm 66 of the lever, but the instant the key is swung back to the position shown in Fig. 7, the abutment is thrown down out of the path of the lever 40, and the operative connection between the lever and the slide 35 is thus broken. The lever 61 also serves to lock the slide 35 against accidental movement when operated to render the slide inoperative by the automatic mechanism. To effect this result the slide 35 is provided with a lateral extension or shoulder 35ª in advance of which the arm 66 is moved when swung down to depress the abutment 43, it being noted that the upper edge of the arm 66 is of arcuate form so that when the arm is in locking position there is not sufficient play between the shoulder 35ª and said arm to permit the slide to move forward far enough to accidentally connect the keys with the adding mechanism.

Figure 13:
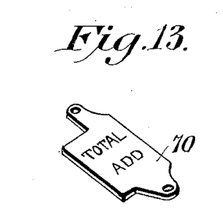
Fig. 13 is a similar view of the lower indicator plate.
Figure 14:
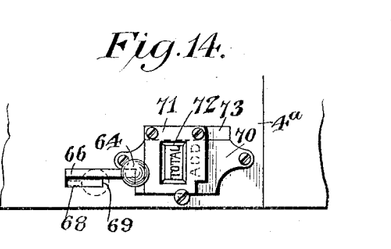
Fig. 14 is a plan view of one end of the carriage, showing the indicator and the key.

*The indicator.* It is desirable to provide the machine with an indicator by means of which the operator may tell at a glance whether the keys are connected to the adding mechanism or disconnected therefrom. For this purpose I attach to the cover-plate 4ª a lower indicator plate 70 bearing suitable indications, as for instance the words "total" and "add," arranged one in advance of the other, as shown in Figs. 7, 13 and 14.

Arranged to slide upon the plate 70 is an upper indicator plate 71 having an opening 72 through which one of the indications on the plate 70 may be viewed, the other indication being obscured by the plate. The upper indicator plate 71 moves with the slide 35 and is attached thereto in any suitable manner, as for instance by a block 73 which extends through the cover-plate 4ª, as shown in Fig. 7. Thus when the slide 34 and the disconnecting key 64 are in normal position, the indicator will display the word "total," signifying that the keys are disconnected, so that numerals may be written outside of the adding field or column without operating any part of the adding mechanism. When, however, the printing point of the typewriter moves into the adding field from the left side thereof, and the actuator moves opposite the register, the automatic connecting mechanism will operate in a manner heretofore described to advance the slide 35 and thus connect the keys and adding mechanism, the indicator being simultaneously operated to obscure the word "total," and to display the word "add," indicating that the keys are connected to the adding mechanism for addition. When the printing point of the machine moves to the right of the column or adding field, the slide and its associated parts will be automatically restored to normal position, and the indicator will again display the word "total," signifying that the keys and adding mechanism are again disconnected, and that numerals may be printed beyond the adding field by the unrestricted independent use of the typewriter. These relations of the parts and the operation described will continue under normal conditions, the keys being normally disconnected from the adding mechanism, and being automatically connected thereto only at such times as the machine is operating in the adding field.

When it is desired to print numerals in what would otherwise be the adding field or column without operating the adding mechanism, as for instance, in printing a total at the foot of the column, it is merely necessary to move the "total" key back sufficiently to depress the abutment 43, and thus break the connection between the slide and the automatic slide operating device. In that event, when the machine moves into the adding field from the right, the slide operating mechanism will operate, but will effect no movement whatever of the slide, and the latter will therefore remain in its normal position, and will fail to connect the keys and adding mechanism so that the latter will not be operated during the printing of numerals in what would otherwise be the adding field.

It will thus be seen that while the invention contemplates the automatic connection of the keys and adding mechanism when the adding field is reached, it also embraces means, whereby the automatic key connecting mechanism may be placed entirely out of action to permit the unrestricted independent use of the typewriter in printing entirely across the sheet, including the adding field. Obviously however, other indications might be substituted for the words "total" and "add," as for instance the words "disconnected" and "connected," signifying that the keys are disconnected from or connected to the operating connections of the register. It is also immaterial whether the indications are displayed on a separate indicator plate or whether they are imprinted or otherwise produced directly upon the cover-plate of the carriage, the separate plate being preferable for the equipment of machines already in use, with the mechanism embodying the present invention.

In conclusion, attention is directed to Patent No. 573,868, to R. J. Fisher, in which the Elliott-Fisher typewriter here shown is exemplified, and to Patent No. 829,971 to Laganke and Smith, to which reference is made for a more complete disclosure of the register operating connections than has been deemed necessary for the purpose of this description.

Attention may also be directed to the co-pending application of John A. Smith, in which is disclosed a construction broadly analogous to my invention, but embracing no structure to which I make claim.

It is thought that from the foregoing, the construction and operation of my invention will be fully comprehended; but while the construction shown and described is thought at this time to be preferable, I wish to be understood as reserving the right to effect such changes, modifications, and variations thereof as may come fairly within the scope of the protection prayed.

What I claim is:—

1. In a combined typewriting and adding machine, the combination with a typewriter including a carriage, keys, and printing mechanism, of a computing device, key-operated actuating mechanism for the computing device, said mechanism including a member movable into and out of operative position, means operated by the movement of the carriage and controlling the position of said member, said means including a movable element, a second element operated thereby, and an abutment movable into and out of operative position independently of both elements and arranged when in operative position to establish a coöperative relation between said elements.

2. In a combined typewriting and adding machine, the combination with a carriage, keys, and printing mechanism, of adding mechanism normally disconnected from the keys, automatic mechanism connecting the keys and adding mechanism, said automatic mechanism including a slide, an abutment movably mounted on the slide, and a slide-operating member disposed to engage the abutment, and means for moving the abutment to an inoperative position to prevent the operation of the slide by the operating member.

3. In a combined typewriting and adding machine, the combination with a typewriter including a carriage, keys, and printing mechanism, of adding mechanism normally disconnected from the keys, a slide movable to connect the adding mechanism and keys, a movable abutment carried by the slide, an operating member engaging the abutment to move the slide, and a key for moving the abutment to an inoperative position.

4. In a combined typewriting and adding machine, the combination with a typewriter including a carriage, keys, and printing mechanism, of adding mechanism normally disconnected from the keys, a swinging yoke movable to connect the keys and adding mechanism, a cam-operated member, a plurality of motion transmitting elements between the cam-operated member and the yoke, one of said elements being independently movable to an inoperative position, and means for moving said element to its inoperative position to prevent the transmission of motion from the cam-operated member to the yoke.

5. In a combined typewriting and adding machine, the combination with a typewriter including a carriage, keys, and printing mechanism, of adding mechanism normally disconnected from the keys, a slide movable to effect a connection between the adding mechanism and keys, a swinging abutment carried by the slide, a lever disposed to engage the abutment to move the slide, mechanism brought into action by the movement of the carriage to move the lever, and means for moving the abutment out of coöperative relation with the lever.

6. In a combined typewriting and adding machine, the combination with a typewriter including a carriage, keys, and printing mechanism, of adding mechanism normally disconnected from the keys, means including a slide movable to connect the keys and adding mechanism, a lever arranged to operate the slide, a bell crank lever arranged to operate the lever first named, a rock shaft for moving the bell crank lever, and cam-operated means for rocking said shaft.

7. In a combined typewriting and adding machine, the combination with a typewriter including a carriage, keys, and printing mechanism, of adding mechanism normally disconnected from the keys, and automatic means for causing the connection of the keys and adding mechanism, said means including a cam, and an arm arranged to travel under the cam in one direction and over the cam in the opposite direction.

8. In a combined typewriting and adding machine, the combination with a typewriter including a carriage, keys, and printing mechanism, of adding mechanism normally disconnected from the keys, an element movable to cause the connection of the keys and adding mechanism, automatic means for moving said element, and means movable to render said element inoperative by the automatic means and to lock said element against accidental movement.

9. In a combined typewriting and adding machine, the combination with a typewriter including a carriage, keys, and printing mechanism, of means operative to cause the keys and adding mechanism to be connected, an automatic device for operating said means, and a key-operated device for rendering the automatic device inoperative to operate said means, and for locking said means against accidental movement.

10. In a combined typewriting and adding machine, the combination with a typewriter including a carriage, keys, and printing mechanism, of adding mechanism normally disconnected from the keys, means operative to cause the keys and adding mechanism to be connected, an automatic device for operating said means, and means for positively locking the first named means against movement in a direction to cause the operative connection of the keys and adding mechanism.

11. In a combined typewriting and adding machine, the combination with a typewriter including a carriage, keys, and printing mechanism, of adding mechanism normally disconnected from the keys, a member movable to cause the keys and adding mechanism to be connected, a movable abutment carried by said member, means for operating the member through the abutment, and means operative to move the abutment to an inoperative position and to lock the connecting member against accidental movement in a direction to cause the connection of the keys.

12. In a combined typewriting and adding machine, the combination with a typewriter including a carriage, keys, and printing mechanism, of adding mechanism disconnected from the keys, means including a slide movable to cause the connection of the keys and adding mechanism, said slide being provided with a shoulder, and a key-operated locking device movable into engagement with said shoulder.

13. In a combined typewriting and adding machine, the combination with a typewriter including a carriage, keys, and printing mechanism, of adding mechanism disconnected from the keys, a slide provided with a movable abutment and with a shoulder, means for operating the slide through the abutment, means operated by the slide to connect the adding mechanism with the keys, and a member operative to move the abutment to an inoperative position and to lock the slide by coöperation with the shoulder thereof.

14. In a combined typewriting and adding machine, the combination with a typewriter including a carriage, keys, and printing mechanism, of a computing device, key-operated actuating mechanism for the computing device, said mechanism including a member movable into and out of operative position, means operated by the movement of the typewriter carriage and controlling the position of said member, said means including a cam, an element operated thereby, a second element through which the movable member of the actuating mechanism is controlled by the cam-operated element, and an abutment movable into and out of operative position independently of both elements and arranged when in operative position to establish a coöperative relation between said elements.

15. In a combined typewriting and adding machine, the combination with a typewriter, including a frame, a carriage, keys, and printing mechanism, of a computing device, key-operated actuating mechanism for the computing device, said mechanism including a member movable into and out of operative position, means operated by the movement of the carriage to move said member from one position to the other, said means including elements which are movable and fixed respectively, and carried respectively by the frame and carriage of the typewriter, and connecting means between the movable element and the movable member of the actuating mechanism, said connecting means including a device which is movable into and out of operative position independently of the movable element and which, when in operative position, serves to transmit motion from said movable element to the movable member of the actuating mechanism.

16. In a combined typewriting and calculating machine, the combination with a typewriter including a carriage, keys, and printing mechanism, of a computing device, key-operated actuating mechanism for the computing device, said actuating mechanism including a member occupying a normally inoperative position, and means for moving said member into operative position, said means including coöperating devices mounted on the frame and carriage respectively of the typewriter, one of said devices being movable when engaged by the other, and connecting means whereby the movable device serves, when operated, to shift the movable member of the actuating mechanism into operative position, said connecting means including an element movable independently of the movable device to disconnect said device from the movable member of the actuating mechanism and to thus prevent the automatic connection of the keys with the computing device.

In testimony, that I claim the foregoing as my own, I have hereto affixed my signature in the presence of two witnesses.

PATRICK H. TURLEY.

Witnesses:
JORAM ZIEGLER,
J. A. SMITH.